No. 714,504. Patented Nov. 25, 1902.
J. E. MENNESSIER.
VARIABLE SPEED AND REVERSING GEAR FOR MOTOR CARS, TOOLS, OR OTHER APPARATUS.
(Application filed Mar. 22, 1902.)
(No Model.) 2 Sheets—Sheet 1.
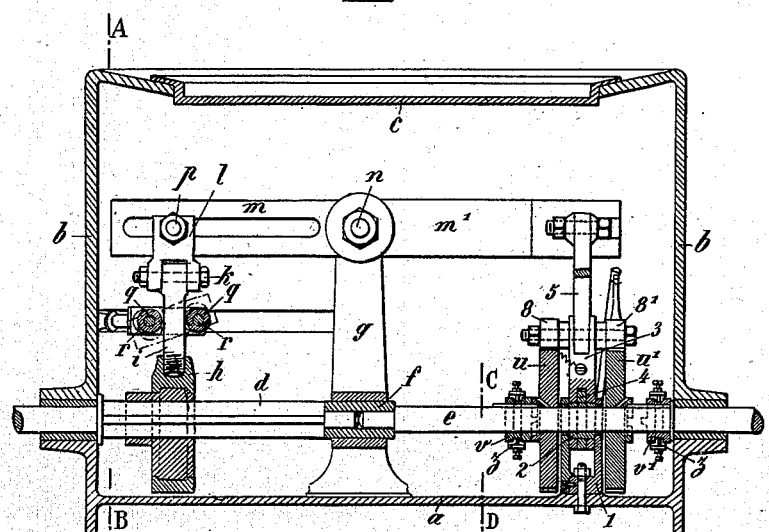
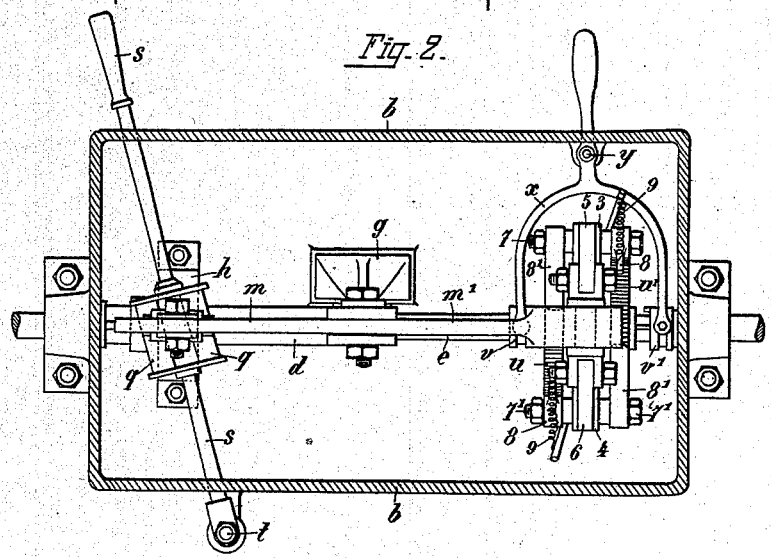
WITNESSES:
Walton Harrison
INVENTOR
Joseph Edouard Mennessier
BY
ATTORNEYS

UNITED STATES PATENT OFFICE.

JOSEPH EDOUARD MENNESSIER, OF PARIS, FRANCE.

VARIABLE-SPEED AND REVERSING GEAR FOR MOTOR-CARS, TOOLS, OR OTHER APPARATUS.

SPECIFICATION forming part of Letters Patent No. 714,504, dated November 25, 1902.

Application filed March 22, 1902. Serial No. 99,427. (No model.)

*To all whom it may concern:*

Be it known that I, JOSEPH EDOUARD MENNESSIER, engineer, of 59 Rue de la Roquette, in the city of Paris, Republic of France, have invented Variable-Speed and Reversing Gear for Motor-Cars, Machine-Tools, or other Apparatus, of which the following is a full, clear, and exact description.

This invention relates to a system of variable-speed and reversing gear which is chiefly characterized by the arrangement upon a driving-shaft of an eccentric which is capable of being shifted longitudinally of said shaft for the purpose of gradually varying the speed, which transmits through the medium of a rocking lever and pawl-carrying arms a movement of rotation to two ratchet-wheels, which are thrown into gear alternatively by means of a clutch with a driven shaft, by which a continuous rotary motion is imparted. The two ratchet-wheels are each operated by a pair of pawls in such manner that their motion is opposite the one to the other, so that according as one or other of said ratchets is thrown into gear with the driven shaft a forward or backward movement is obtained. The driving-shaft being independent of the driven shaft, it will be seen that whatever may be the direction of rotation of the driving-shaft the driven shaft will always rotate in the desired direction.

My invention is illustrated by way of example in the accompanying drawings, wherein—

Figure 3:
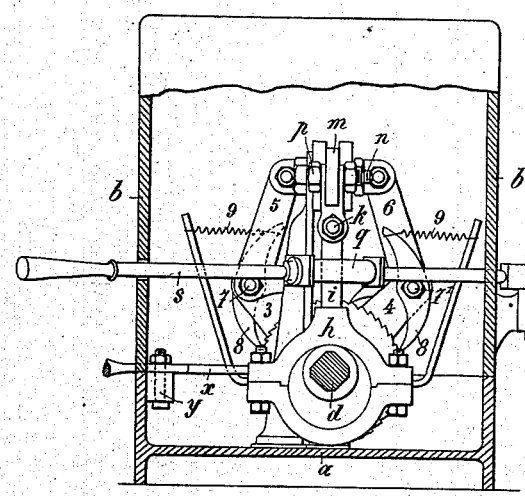
Figure 4:
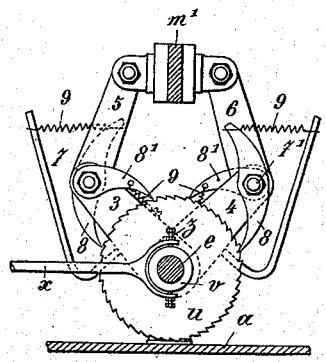
Figures 5, 6:
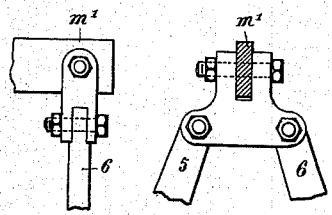

Figure 1 represents a longitudinal vertical section of the mechanism. Fig. 2 is a plan with the cover of the casing in which the apparatus is inclosed removed. Fig. 3 is a transverse vertical section on line A B, Fig. 1; and Fig. 4 is a similar section on line C D, Fig. 1. Figs. 5 and 6 show separately in side and face views a modification in the mode of fixing or attaching the pawl-carrying arms to the rocking lever.

The same characters of reference denote like parts in the several figures.

The apparatus is inclosed, as shown, within a casing, in which all the parts are immersed in a bath of oil. The casing is made in three parts $a\ b\ c$, which are suitably fitted together and serve to support the driving-shaft $d$ and the driven or transmission shaft $e$. The shafts $d$ and $e$ in the example shown are in axial alinement, (but they may be otherwise arranged,) and their adjacent ends are supported in a common bearing $f$, carried by a standard $g$, suitably fixed to the bottom $a$ of the casing. The part of the shaft $d$ within the casing is squared, and upon this part is mounted the longitudinally-shiftable eccentric $h$, whereof the strap and rod $i$ are connected by a joint $k$ to a bracket $l$, fitted to slide upon the longitudinally-slotted arm $m$ of a rock-lever pivoted at $n$ on standard $g$. In the slot of the arm $m$ is fitted to slide a die-block connected by bolt $p$ to the bracket $l$, so as to permit of sliding movement of the bracket along the arm $m$ simultaneously with the shifting of the eccentric $h$ upon the shaft. This shifting movement is produced by means of a pair of friction-rollers $q$, turning loose on axes $r$, fixed in a frame carried by a hand-lever $s$, the friction-rollers embracing the eccentric-rod $i$, so as to shift the eccentric to and maintain it in the desired position for varying the speed. This hand-lever $s$ is pivoted at $t$ and may either be horizontal, as in Fig. 2, or vertical, as in dotted lines in Fig. 1.

On the driven or transmission shaft $e$ two oppositely-toothed ratchet-wheels $u\ u'$ are mounted loose, their bosses being adapted for engagement by the clutches $v\ v'$, splined on the shaft $e$ and thrown in or out of gear alternately by means of a clutch-fork $x$, pivoted at $y$, each limb of this fork being forked and provided with studs $z$, engaging in the groove of the corresponding clutch $v$ or $v'$.

In a fixed support 1 is fitted a sleeve 2, through which the shaft $e$ passes freely and upon which are pivoted two radius-arms 3 4, connected by links 5 6 with the arm $m'$ of the rock-lever. Upon each of the joint-pins 7 and 7' of the radius-arms 3 4 and links 5 6 are pivoted two pawls 8 8', adapted to engage with the oppositely-toothed ratchet-wheels $u\ u'$ and maintained constantly in engagement therewith by means of springs 9.

The operation is as follows: The driving-shaft $d$ transmits oscillating motion to the rock-lever $m$ through the medium of the eccentric $h$, during which movement the toggles formed by the links 5 6 and the radius-arms 3 4, which carry the pawls 8 8', are alternately straightened and flexed. By shifting eccentric $h$ away from or toward the center of oscillation n by means of the hand-lever s the amplitude of oscillation of the rock-lever is varied and the ratchet-wheels u u' receive, through the pawls 8 8', rotary motion in the reverse direction the one to the other, which movement will be transmitted to shaft e by the one of the two clutches v v' which is in gear with the corresponding ratchet-wheel. According to the amplitude of the oscillations of the rock-lever the ratchet-wheels u u' will be advanced a greater or less number of teeth, and during the downward motion one of the pawls of one pair will drive the ratchet, while a pawl of the other pair slips on that ratchet in order to drive it during the ascending movement, so as to produce continuous rotary motion varying in speed according to the angle of the oscillations obtained by the shifting of the eccentric h upon shaft d, the nearer the eccentric is brought to the center of oscillation of the rock-lever the greater being the speed produced. The motion is reversed by throwing the other clutch into gear, and stoppage is produced by throwing both clutches out of gear. By gradually shifting the eccentric upon the driving-shaft a gradually increasing or decreasing speed may be obtained.

The ratchet-wheels referred to may be replaced by suitable toothed gearing. The pawls may be so arranged as to be completely disengaged for the purpose of stopping, and the two left-hand pawls may also be in gear for forward motion and the two right-hand pawls be in gear for backward motion.

The forms, dimensions, and details of construction of the apparatus may be varied without in any way departing from the invention.

I claim—

1. An apparatus of the kind described, comprising a frame, a shaft revolubly mounted thereon, an eccentric mounted upon said shaft and normally free to slide in the general direction thereof, a rocking lever, mechanism slidably connected therewith, and also connected with said eccentric, toggles connected with said rocking lever, oppositely-disposed pawls mounted upon said toggles, a driven shaft, and oppositely-disposed ratchet-wheels mounted upon said shaft, said ratchet-wheels being engaged by said pawls.

2. An apparatus of the kind described, comprising a frame, a shaft revolubly mounted thereon, ratchet-wheels loosely mounted upon said shaft and free to rotate in opposite directions, pawls for preventing retrogression of said ratchet-wheels relatively to said shaft, and clutch mechanism controllable at will for rigidly securing said shaft to and releasing the same from said ratchet-wheels independently.

3. An apparatus of the kind described, comprising a frame, a shaft revolubly mounted therein, separate ratchet mechanisms for rotating said shaft in opposite directions, means controllable at will for throwing said shaft into and out of engagement with said ratchet mechanisms independently, an oscillating lever for actuating said ratchet mechanisms, and means controllable at will for varying the stroke of said lever.

4. An apparatus of the kind described, comprising a frame, a shaft revolubly mounted therein, separate ratchet mechanisms for rotating said shaft in opposite directions, means controllable at will for throwing said shaft into and out of engagement with said ratchet mechanisms independently, an oscillatory lever for actuating said ratchet mechanisms, said lever being provided with a longitudinal slot, a head slidably engaging said slot, means for shifting said head to different portions of said slot, and cam mechanism for actuating said head, whereby an oscillating motion is given to said lever.

5. An apparatus of the kind described, comprising a frame, a shaft journaled therein, an oscillatory lever, means for operatively connecting said lever with said shaft, a bracket mounted upon said lever and slidable in the general direction of the length of said lever, a second shaft, an eccentric slidably mounted thereon, a member connecting said eccentric and said bracket, and means controllable at will for bodily sliding said bracket, said eccentric, and said member in a direction substantially parallel with the general direction of said lever so as to alter the amplitude of the oscillations thereof.

The foregoing specification of my "Variable-speed and reversing gear for motor-cars, machine-tools, and other apparatus" signed by me this 5th day of March, 1902.

JOSEPH EDOUARD MENNESSIER.

Witnesses:
EDWARD P. MacLEAN,
MAURICE H. PIGNET.